June 10, 1941.   A. LYSHOLM   2,244,716
REDUCTION GEAR FOR TURBINE LOCOMOTIVES
Filed April 11, 1939   3 Sheets-Sheet 1

INVENTOR.
Alf Lysholm
BY
Jarvis C. Marble
his ATTORNEY.

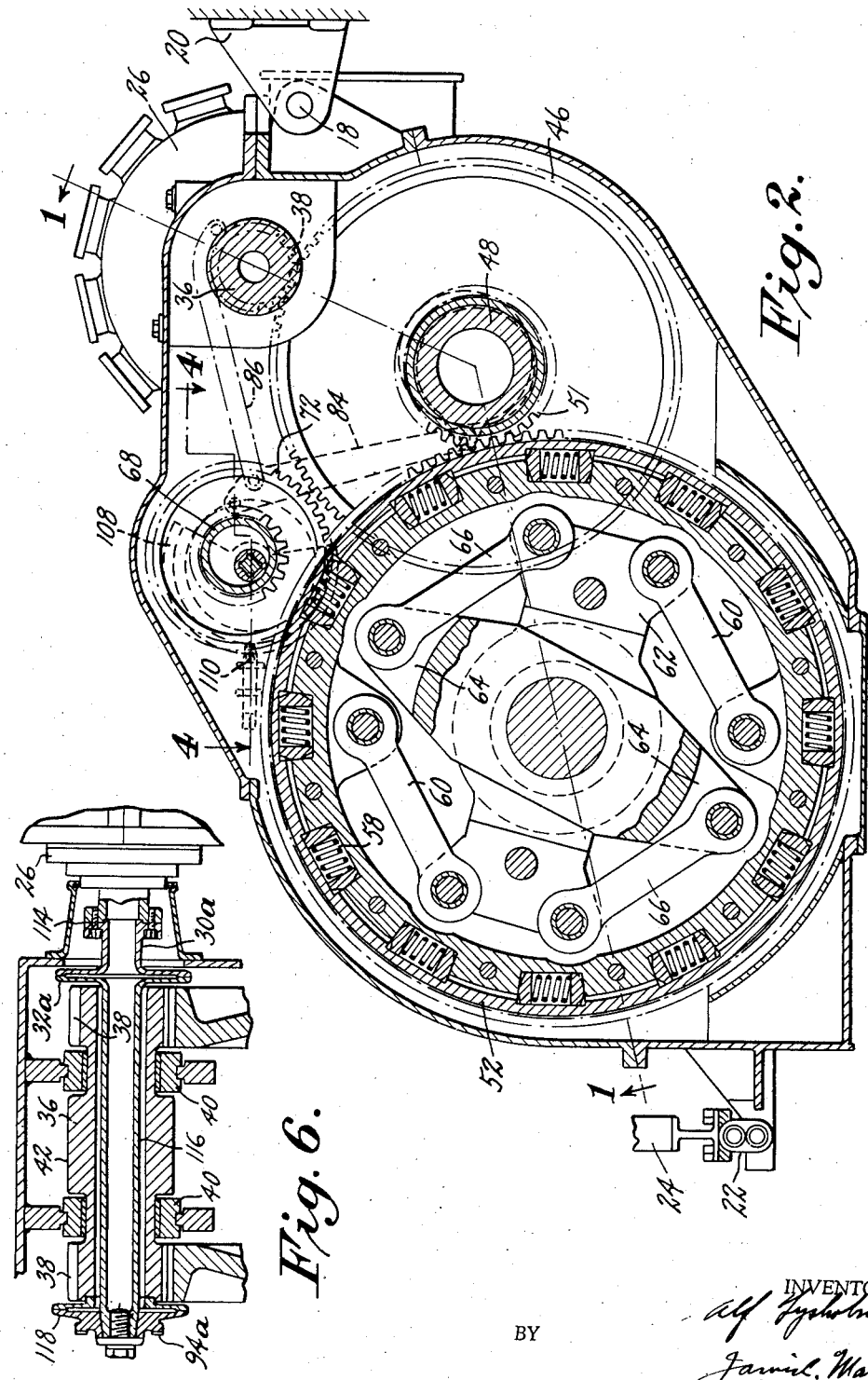

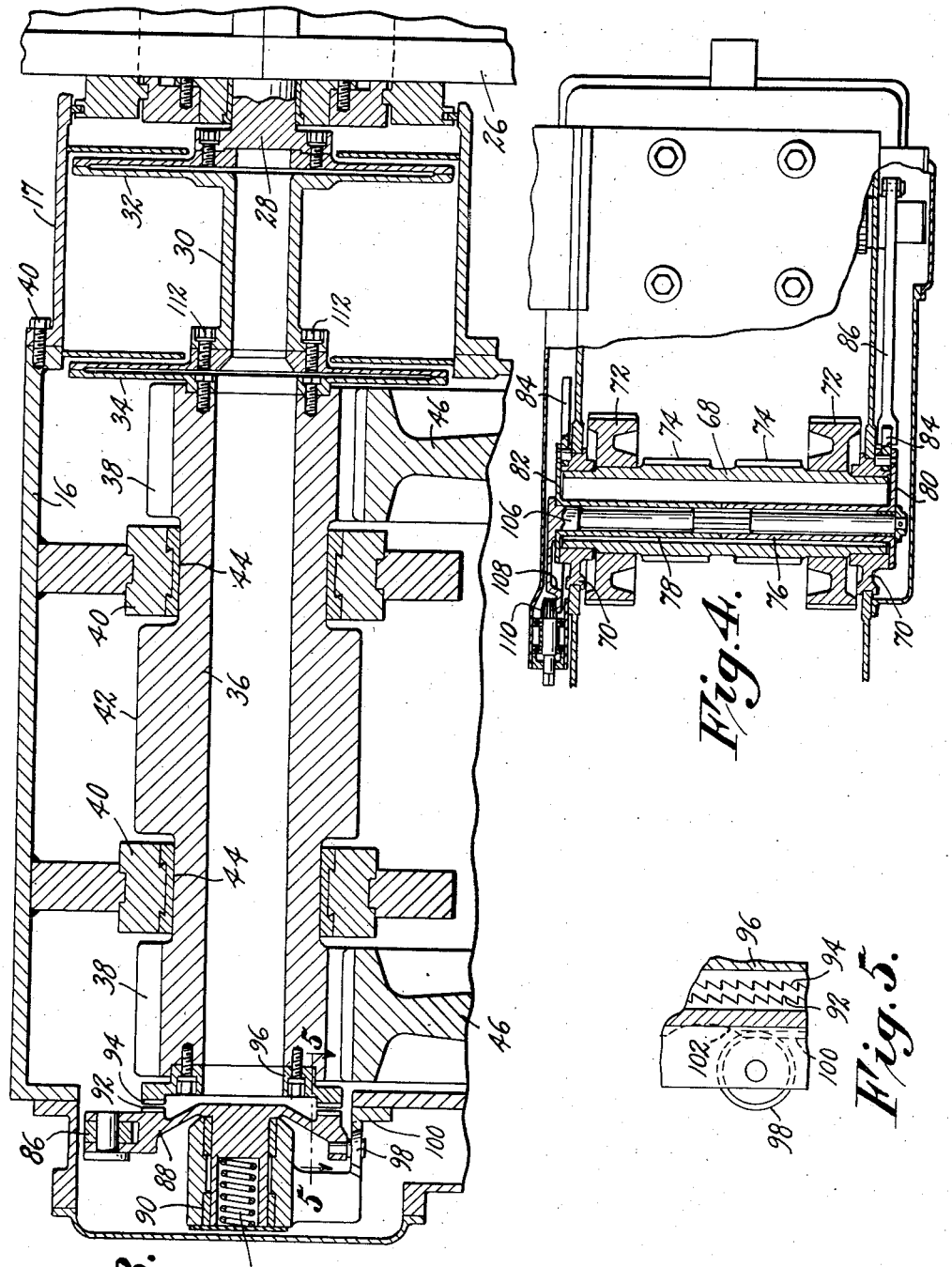

Patented June 10, 1941

2,244,716

UNITED STATES PATENT OFFICE 2,244,716

REDUCTION GEAR FOR TURBINE LOCOMOTIVES

Alf Lysholm, Stockholm, Sweden, assignor to Aktiebolaget Ljungströms Ångturbin, Stockholm, Sweden, a corporation of Sweden Application April 11, 1939, Serial No. 267,246
In Great Britain April 12, 1938

6 Claims. (Cl. 105—38)

The present invention relates to reduction gears for turbine driven locomotives and has particular reference to gears of this type in which speed reduction is effected in two or more stages from the turbine shaft to a driving axle of the locomotive. The invention further refers to gears of the above type which provide for reversing the direction of drive through the main gearing.

More specifically, the invention relates to two-stage gears or multiple stage gears in which the last two stages of the gearing are located between the side members of the locomotive frame.

For numerous reasons it is highly advantageous to be able to arrange the last reduction stages between the side members of the locomotive frame, but for high power locomotives wherein high torques must be transmitted through the lower speed stages of the gearing, it is difficult to so arrange the gearing that the last two stages can satisfactorily be located between the side members, because of the very limited space available between these members.

It is the general object of the present invention to provide a novel and improved form of two stage gear reduction unit so constructed that the unit may readily be mounted between conventionally spaced side members, while at the same time being capable of transmitting high values of power to the driving axle. Such a gear unit provides numerous practical advantages, among which is that of ready removability of the unit from the locomotive for purposes of repair or replacement, without disturbing the other major units. Such a unit may be driven directly by the turbine shaft, or may receive its drive from an additional primary reduction gear associated with the turbine.

In order to more fully understand the detailed nature of the invention, and the manner in which its general and more detailed objects are carried into effect, reference may best be had to the ensuing portion of this description and to the accompanying drawings in which are described and illustrated suitable forms of apparatus for carrying the invention into effect.

By way of example, the embodiments illustrated show forms of structure in which the total gear reduction between turbine and driving axle is accomplished in two stages, but it will be understood that the invention is not necessarily limited to this particular arrangement.

In the drawings:

Fig. 2 is a vertical section of the gearing shown in Fig. 1;

Fig. 3 is a view showing on larger scale a part of the structure illustrated in Fig. 1;

Fig. 4 is a section taken generally along the line 4—4 of Fig. 2;

Fig. 5 is a section taken on the line 5—5 of Fig. 3; and

Fig. 6 is a view similar to Fig. 3 showing a different form of construction.

Figure 1:
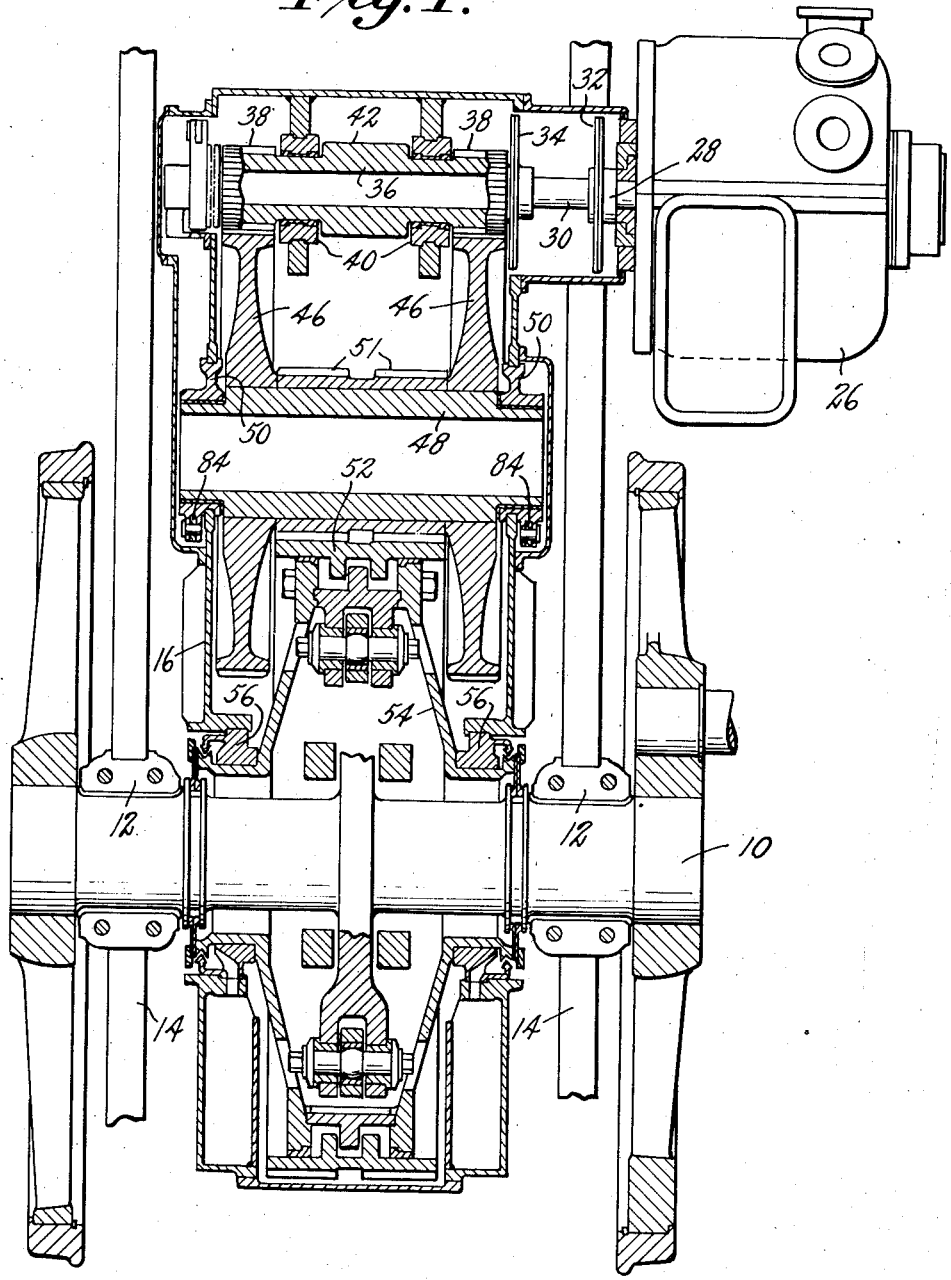
Fig. 1 is a more or less diagrammatic view taken on the line 1—1 of Fig. 2 and showing gearing embodying the invention.

Referring now to the figures, 10 indicates a driving axle of a locomotive mounted in suitable bearings 12 located in the side frames 14.

The gear box 16 is located between the side frames and is in the form of a unit structure containing the double reduction gearing hereinafter to be more fully described. As will be seen more clearly from Fig. 2, the gear box is pivotally mounted on a suitable supporting bracket 20 attached to the engine frame and is further supported by links, one of which is shown at 22, which are pivotally connected to suitable supports 24 and which permit relative expansion and contraction of the gear unit with respect to the locomotive frame.

The driving turbine 26 for the locomotive is mounted in any suitable manner outside the frame and the turbine shaft 28 is connected by means of a hollow shaft member 30 and flexible diaphragm connections 32 and 34 to a pinion shaft 36. The hollow shaft 30 and diaphragms 32 and 34 provide a suitably flexible drive between the turbine and the pinion shaft.

The driving connection between the turbine and the pinion shaft is advantageously enclosed in a split casing 17 removably secured as by means of bolts 40 to one side of the main gear casing 16 and, depending upon the specific construction of the locomotive, the casing 17 may be located above or extend through a suitable opening in the side frame.

The pinion shaft 36 has formed integrally therewith at its outer ends the pinions 38 of the first stage of the reduction gearing and as will be observed from the drawings, the shaft is mounted in bearings 40 intermediate its ends and inside of the pinions 38. These bearings may be said to be inboard bearings supporting a pinion shaft with outboard pinions.

The intermediate portion 42 of the shaft between the journals 44 is made of substantially larger diameter than these journals and the construction is such that this pinion shaft, together with its pinions, provides a very rigid body.

The specific construction and arrangement of the bearings for this pinion shaft constitute an important part of the present invention since this construction contributes very materially to the possibility of constructing a double reduction gear unit sufficiently large and strong to transmit high values of power while at the same time being sufficiently narrow to be inserted between side frames of a locomotive of usual construction.

The pinions 38 mesh with spaced gears 46 mounted on the hollow shaft 48 which at its ends is carried eccentrically by the gearings members 50 turnably mounted in the gear casing 16. Between the gears 46, a second pair of pinions 51 are carried by the shaft 48, which pinions mesh with the rim member 52 of an axle gear 54 journaled in bearings 56 carried by the gear casing. The rim member 52 of gear 54 is resiliently connected to the main body of the gear through a series of tangential springs 58 interposed between suitable abutment projections on the rim and main gear parts respectively. The axle gear is connected to the driving axle 10 of the locomotive by means of tangentially arranged pivoted links 60 connected to a floating link member 62, which member is in turn connected to suitable driving projections 64 on the axle by means of pivoted links 66.

Thus, in the final drive there is provided peripheral resilience for absorbing shock and a link drive between the axle gear and the axle which will permit relative displacement of the axle with respect to the gear unit without producing twisting strains on the gear unit.

As will be seen from Figs. 2 and 4, a reversing gear arrangement is provided comprising a hollow reversing shaft 68 mounted in eccentric bearings 70 turnably mounted in the gear casing, the reversing shaft carrying spaced gears 72 between which are located pinions 74. Two sleeve members 76 and 78 are located inside the hollow shaft 68 and at their outer ends are provided with flange like end plates 80 and 82 respectively. Links 84 connect the end plates 80 and 82 with the bearing members 50 in which the shaft 48 is eccentrically mounted and a link 86 connects one of the links 84 with a clutch member 88 (Fig. 3) rotatably and slidably mounted in a bearing 90 coaxial with the pinion shaft 36. The clutch member 88 is provided with a ring of teeth 92 facing teeth 94 on a second clutch member 96 secured to the pinion shaft 36 and member 88 further carries a radially extending roller 98 bearing against a cam 100 secured to the casing 16. As will be seen from Fig. 5, the cam member 100 is cut away for a portion of its length to provide a recess 102 in the cam face.

A spring 104 tends to force the clutch member 88 axially to bring the teeth 92 and 94 into engagement.

Referring again to Fig. 4, the sleeves 76 and 78 are turned by means of a shaft 106 splined at its center to engage both sleeves and at one end carrying a gear segment 108 meshing with a bevel pinion 110. A suitable control rod (not shown) is adapted to be attached to the end of the shaft carrying the pinion 110.

The operation of the reversing mechanism is as follows: After the locomotive has been brought to rest, the pinion 110 is turned in a direction resulting in movement of the hollow reversing shaft toward the gears 46 and also toward the rim member 52 of the axle gear. This movement is effected by the turning movement of the eccentric bearing members 70. Through the links 84, turning movement of the bearing members 50, with respect to which shaft 48 is eccentrically mounted, is simultaneously effected to move the pinions 51 out of mesh with the rim 52 of the axle gear. In the position in which the locomotive has come to rest it may be that gears 72 cannot be brought into mesh with gears 46 and pinions 74 brought into mesh with the rim 52 of the axle gear, because of certain sets of teeth being improperly positioned. In order to overcome any difficulty of this kind, the link 86 and clutch member 88 are provided. From Fig. 2 it will be observed that when the reversing mechanism is operated to bring the reversing gears into mesh, the clutch member 88 is also turned and as the roller 98 is moved into the recess 102 in the cam face, the spring 104 causes teeth 92 and 94 to engage to transmit turning movement to the pinion shaft 36 and gears 46, so that in the event any teeth are in face to face relation with the teeth on the reversing gears, this relation can be changed to permit the gears to be meshed.

As will be observed from Fig. 1, the main axle gear assembly, which must include the link drive power transmitting mechanism, must be of relatively large and heavy construction since the low speed of this unit must necessarily result in high torque being transmitted therethrough when high values of power are transmitted. This assembly takes up substantially the entire available space between the main axle bearings, and the gears 46 must of necessity be placed outside the main axle gear assembly. These wide spread gears and their bearings also occupy substantially the entire available space between the side frames and in the ordinary form of construction it would be impossible to mount the pinion shaft in a gear unit in which the pinion shaft and its mounting would be sufficiently short to enable the gear casing to be limited to a width less than the width between the locomotive side frames.

By mounting the pinion shaft in inboard bearings with outboard pinions, the required spacing between the gears 46 can be maintained while providing a pinion shaft no longer than the overall distance across the gears 46. An arrangement such as this requires great rigidity of the pinion shaft and in the present instance this is secured by enlarging the diameter of the shaft by a substantial amount between the bearings in which it is mounted. This enlargement of the shaft is required because the bearings themselves must be of relatively small diameter owing to the extremely high speed of rotation of this pinion shaft, which places a definite limitation upon bearing diameter if the linear bearing speed is to be maintained within permissible limits.

With the unit constructed in the manner described, it will be observed from Figs. 1 and 3 that the unit as a whole may very readily be dropped from between the side frames of the locomotive in case it is desired to remove the unit for any reason. It will be understood, of course, that the unit would be removed together with the driving axle which passes through the gearing, since the axle bearings in conventional locomotive construction are always made removable from the bottom of the frame members. In order to effect such removal it is only necessary to remove the split casing member 17 at one side of the pinion shaft, thus making accessible the bolts 112 which permit the coupling shaft 30 to be disconnected from the pinion shaft 36. With this connection removed it will be evident from Fig. 1 that the entire gear unit may readily be dropped from between the frames.

In Fig. 6, a different form of connection to the pinion shaft 36 is illustrated. In this embodiment a hollow coupling shaft 30a is connected to the turbine shaft by means of bolts 114, and the coupling shaft is connected by means of the flexible diaphragm connection 32a to a hollow coupling shaft 116 which passes through hollow pinion shaft 36. The coupling shaft 116 is connected by means of the diaphragm connection 118 to the end of the pinion shaft opposite the turbine. One member of the diaphragm coupling may advantageously be provided with teeth 94a for use in connection with the reversing gear. In this arrangement, as in the arrangement previously described, the characteristic form of the turbine shaft 36 is retained, this shaft carrying the outboard pinions 38 mounted between the inboard bearings 40 and having the intermediate section 42 between the bearings.

It will be understood that the invention is not limited to the specific forms of construction hereinbefore described by way of example, but is to be considered as including all of the apparatus falling within the scope of the appended claims.

What is claimed is:

1. In a turbine driven locomotive, a driving axle having driving wheels fixed thereon, side frame members carrying bearings for said axle, said frame members and bearings being located between said driving wheels, a two-stage speed reducing gear unit comprising a casing located between said frame members, said casing having a pinion shaft located therein adapted to be connected at one end to a turbine located laterally and exteriorly of the casing, an intermediate shaft in said casing having pinion means thereon located between gears meshing with the pinions on said pinion shaft, the pinions on said pinion shaft being spaced apart by substantially the distance occupied by the pinion means on the intermediate shaft, and the unsupported portion of the pinion shaft between the pinions thereon being substantially enlarged as compared with the shaft journals.

2. In a turbine driven locomotive, a driving axle having driving wheels fixed thereon, side frame members carrying bearings for said axle, said frame members and bearings being located between said driving wheels, a two-stage speed reducing gear unit comprising a casing located between said frame members, said casing having a pinion shaft located therein adapted to be connected at one end to a turbine located laterally and exteriorly of the casing, said shaft having outboard pinions thereon and being supported by spaced inboard bearings, an intermediate shaft in said casing having pinion means thereon located between gears meshing with said outboard pinions, and the unsupported central portion of said pinion shaft between said inboard bearings having a diameter greater than the root diameter of said outboard pinions.

3. In a turbine driven locomotive, a driving axle having driving wheels fixed thereon, side frame members carrying bearings for said axle, said frame members and bearings being located between said driving wheels, a double reduction speed gear unit located between the said frame members, said unit comprising a casing embracing said driving axle and removable from between said side frame members from below together with said driving axle, said unit further comprising a centrally located axle gear, an intermediate gear shaft comprising centrally located pinions meshing with said axle gear, spaced reduction gears axially outside said pinions, a pinion shaft having primary pinions spaced apart to mesh with said reduction gears, said pinion shaft having a central unsupported portion in the space between said primary pinions and said central unsupported portion having a diameter greater than the root circles of said primary pinions, and flexible means for connecting one end of said pinion shaft to a turbine located outside said frame members.

4. In a turbine driven locomotive, a driving axle having driving wheels fixed thereon, side frame members carrying bearings for said axle, said frame members and bearings being located between said driving wheels, a double reduction speed reducing gear unit located between said side frame members, said unit comprising a casing embracing said driving axle and removable from between said side frame members from below together with said driving axle, said unit further comprising a centrally located axle gear, an intermediate gear shaft comprising centrally located pinions meshing with said axle gear, reduction gears axially outside said pinions, a pinion shaft having outboard pinions meshing with said reduction gears, inboard bearings for supporting said outboard pinions and means providing a flexible connection between said pinion shaft and a source of power located outside said frame members.

5. In a turbine driven locomotive, a driving axle having driving wheels fixed thereon, side frame members carrying bearings for said axle, said frame members and bearings being located between said driving wheels, a two-stage gear reduction unit located between said side frame members, said unit including a casing embracing said driving axle and removable together with said driving axle as a unit from between said side frame members from below, said unit further including an axle gear around said axle, an intermediate shaft having pinions meshing with said axle gear and reduction gears mounted outside said pinions, a pinion shaft having spaced apart pinions meshing with said reduction gears, spaced apart bearings for supporting said pinion shaft, the unsupported central portion of the pinion shaft having a diameter greater than the root diameter of said pinions, a flexible driving connection for transmitting power to said pinion shaft, a reversing gear shaft having reversing gears thereon, means for moving said intermediate shaft to bring said reduction gears out of mesh with said axle gear and for moving said reversing gear shaft to bring said reversing gears into mesh with both said axle gear and said intermediate gears, whereby to effect reverse drive through the gear unit and means associated with said reversing mechanism and operatively connected to one end of said pinion shaft for turning the latter upon actuation of the reversing mechanism to insure meshing of the teeth of the reversing gears with their associated gears.

6. In a turbine driven locomotive, a driving axle having driving wheels fixed thereon, side frame members carrying bearings for said axle, said frame members and bearings being located between said driving wheels, a two stage gear reduction unit located between said side frame members, said unit including a casing embracing said driving axle and removable together with said driving axle as a unit from between said frame members of the locomotive from below, said unit further including an axle gear around said axle, an intermediate shaft having pinions meshing with said axle gear and reduction gears mounted outside said pinions, a pinion shaft having outboard pinions meshing with said reduction gears and inboard bearings for supporting said pinions, a flexible driving connection for transmitting power to said pinion shaft, a reversing gear shaft having reversing gears thereon, means for moving said intermediate shaft to bring said reduction gears out of mesh with said axle gear and for moving said reversing gear shaft to bring said reversing gears into mesh with both said axle gear and said intermediate gears, whereby to effect reverse drive through the gear unit and means associated with said reversing mechanism and operatively connected to one end of said pinion shaft for turning the latter upon actuation of the reversing mechanism to insure meshing of the teeth of the reversing gears with their associated gears.

ALF LYSHOLM.